US012697959B2

(12) United States Patent
Urabe

(10) Patent No.: US 12,697,959 B2
(45) Date of Patent: Aug. 4, 2026

(54) VEHICLE CONTROL DEVICE

(71) Applicant: TOYOTA JIDOSHA KABUSHIKI KAISHA, Toyota (JP)

(72) Inventor: Shunsuke Urabe, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 36 days.

(21) Appl. No.: 18/936,013

(22) Filed: Nov. 4, 2024

(65) Prior Publication Data

US 2025/0249887 A1     Aug. 7, 2025

(30) Foreign Application Priority Data

Feb. 7, 2024     (JP) ................................. 2024-017460

(51) Int. Cl.
| | |
|---|---|
| *B60W 20/16* | (2016.01) |
| *B60W 10/06* | (2006.01) |
| *B60W 10/08* | (2006.01) |
| *B60W 10/26* | (2006.01) |
| *F02P 5/15* | (2006.01) |

(52) U.S. Cl.
CPC ............ *B60W 20/16* (2016.01); *B60W 10/06* (2013.01); *B60W 10/08* (2013.01); *B60W 10/26* (2013.01); *F02P 5/1504* (2013.01)

(58) Field of Classification Search
CPC ...... B60W 20/16; B60W 10/06; B60W 10/08; B60W 10/26; B60W 30/182; B60W 2540/10; B60W 2710/0666; B60W 2710/083; B60W 20/15; B60W 2030/18081; B60W 30/18; B60W 30/188; B60W 30/20; B60K 6/48; B60K 2006/4825; Y02T 10/62; F02P 5/1504
See application file for complete search history.

(56) References Cited

U.S. PATENT DOCUMENTS

| | | | | |
|---|---|---|---|---|
| 9,428,184 | B2 * | 8/2016 | Kikuchi | .............. B60W 30/025 |
| 10,076,959 | B2 * | 9/2018 | Nakamura | ............ B60W 10/26 |
| | | (Continued) | | |

FOREIGN PATENT DOCUMENTS

| | | | | | |
|---|---|---|---|---|---|
| DE | 102011111025 | B4 | * | 6/2021 | .............. B60L 15/20 |
| JP | 2009132170 | A | * | 6/2009 | |
| | | (Continued) | | | |

OTHER PUBLICATIONS

JP2019099059A machine translation (Year: 2020).*

(Continued)

*Primary Examiner* — Fadey S. Jabr
*Assistant Examiner* — Mark Robert Heim
(74) *Attorney, Agent, or Firm* — SoraIP, Inc.

(57)     ABSTRACT

A vehicle control device for controlling a power source so as to drive a vehicle in a selected one of a plurality of modes so as to drive the vehicle in at least one power source for outputting power to a drive shaft connected to the axle, and for controlling the power source so as to gradually decrease the torque output to the drive shaft toward a required torque at the time of accelerator-off over a target lowering time, wherein the target lowering time is set to be n times the inverse of the resonance frequency of the drive system including the power source, and n is an integer equal to or greater than a value of 1 and is changed in accordance with the traveling mode.

3 Claims, 4 Drawing Sheets

(56)                    References Cited

U.S. PATENT DOCUMENTS

| | | | | | |
|---|---|---|---|---|---|
| 2009/0159349 | A1* | 6/2009 | Ebuchi | .................. | B60W 10/02 |
| | | | | | 903/945 |
| 2013/0296136 | A1* | 11/2013 | Doering | ............... | F02D 41/065 |
| | | | | | 477/174 |
| 2016/0152143 | A1* | 6/2016 | Nakamura | ........... | B60W 10/26 |
| | | | | | 701/22 |
| 2017/0166052 | A1* | 6/2017 | Ogawa | ................. | B60K 17/344 |
| 2017/0182887 | A1* | 6/2017 | Ogawa | ................. | B60K 17/344 |
| 2018/0237021 | A1* | 8/2018 | Orita | ..................... | B60W 10/10 |
| 2019/0322266 | A1* | 10/2019 | Fukushiro | ............. | B60W 20/10 |
| 2020/0277908 | A1* | 9/2020 | Glugla | ............... | F16H 61/0213 |

FOREIGN PATENT DOCUMENTS

| | | | | |
|---|---|---|---|---|
| JP | 2009184382 | A | * | 8/2009 |
| JP | 2019099059 | A | * | 6/2019 |
| JP | 2019142272 | A | * | 8/2019 |

OTHER PUBLICATIONS

JP-2019142272-A machine translation (Year: 2019).*
JP 2009184382 A machine translation (Year: 2009).*
Chuan et al. NPL Mitigating Torque Ripple Resonant Controller IEEE (Year: 2020).*
DE-102011111025-B4 machine translation (Year: 2021).*

* cited by examiner

VEHICLE CONTROL DEVICE

CROSS-REFERENCE TO RELATED APPLICATION

This application claims priority to Japanese Patent Application No. 2024-017460 filed on Feb. 7, 2024, incorporated herein by reference in its entirety.

BACKGROUND

1. Technical Field

The present disclosure relates to a vehicle control device.

2. Description of Related Art

Conventionally, there has been proposed a vehicle control device to be used for a vehicle including at least one power source that outputs power for travel (see Japanese Unexamined Patent Application Publication No. 2019-99059 (JP 2019-99059 A), for example). In this device, the time over which the magnitude of torque output from the drive source is changed is set to the inverse of the lowest frequency among the resonance frequencies of a plurality of resonance members of a transmission path from the power source to a body. Thus, vibration of the vehicle is suppressed.

SUMMARY

In a vehicle control device, in general, at the accelerator off time, control is performed so as to gradually reduce torque output to a drive shaft from positive drive torque toward negative required torque (braking torque) for the accelerator off time. In this control, vibration may be generated due to torsion of the drive shaft when the torque output to the drive shaft varies from positive torque to negative torque. In order to suppress such vibration, it is conceivable to reduce the rate at which the torque output to the drive shaft is varied to suppress the torsion of the drive shaft, thereby suppressing the vibration. In this case, however, the torque output to the drive shaft is varied slowly, and thus the torque responsiveness is deteriorated. In particular, in a vehicle control device that controls a power source such that a vehicle travels in one travel mode selected from a plurality of modes, a desired torque responsiveness may not be obtained, depending on the travel mode.

A main object of a vehicle control device according to the present disclosure is to both suppress vibration and achieve a torque responsiveness that matches a travel mode.

In order to achieve the above main object, the vehicle control device according to the present disclosure adopts the following means.

An aspect of the present disclosure relates to a vehicle control device to be used for a vehicle including at least one power source that outputs power to a drive shaft connected to an axle. The vehicle control device is configured to: control the power source such that the vehicle travels in one travel mode selected from a plurality of modes; control, at an accelerator off time, the power source such that torque output to the drive shaft gradually reduces over a target lowering time toward required torque for the accelerator off time; and set the target lowering time to n times an inverse of a resonance frequency of a drive system including the power source. The n is an integer having a value of 1 or more, and is changed according to the travel mode.

In the vehicle control device according to the present disclosure, the target lowering time is set to n times the inverse of the resonance frequency of the drive system including the power source, and n is an integer having a value of 1 or more, and is changed according to the travel mode. By setting n to an integer having a value of 1 or more, it is possible to suppress vibration. Further, by changing n according to the travel mode, the torque output from the power source at the accelerator off time can be gradually reduced over the target lowering time that matches the travel mode. Thus, a torque responsiveness that matches the travel mode can be achieved. As a result, it is possible to both suppress vibration and achieve a torque responsiveness that matches the travel mode.

In such a vehicle control device according to the present disclosure, the modes may include a first mode and a second mode that emphasizes an output responsiveness of travel torque compared to the first mode; and the n may be made smaller when the travel mode is the second mode than when the travel mode is the first mode. In this way, the target lowering time can be shortened when the travel mode is the second mode as compared with when the travel mode is the first mode, and the torque output to the drive shaft can be immediately reduced. Thus, the torque responsiveness can be improved in the second mode.

In the vehicle control device according to the aspect of the present disclosure, in which the modes include a first mode and a second mode that emphasizes an output responsiveness of travel torque compared to the first mode, in a case where the travel mode is the second mode, the n may be made larger when a predetermined condition for prohibiting an immediate reduction in torque to be output to the drive shaft is met than when the predetermined condition is not met. *In this way, it is possible to lengthen the time over which the torque output from the power source is reduced when the predetermined condition is met.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
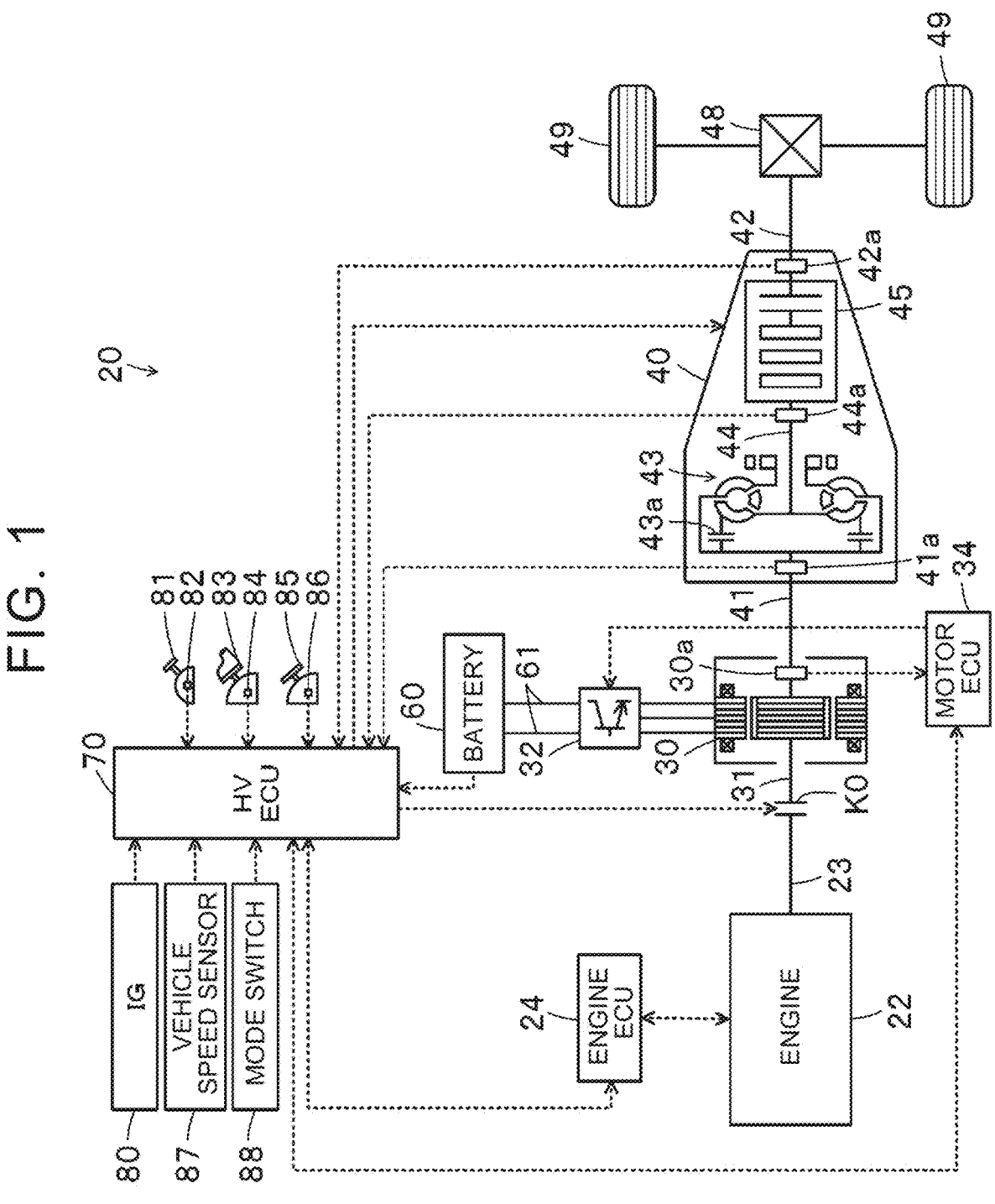
FIG. 1 is a configuration diagram schematically showing a configuration of a hybrid electric vehicle 20.
Figure 2:
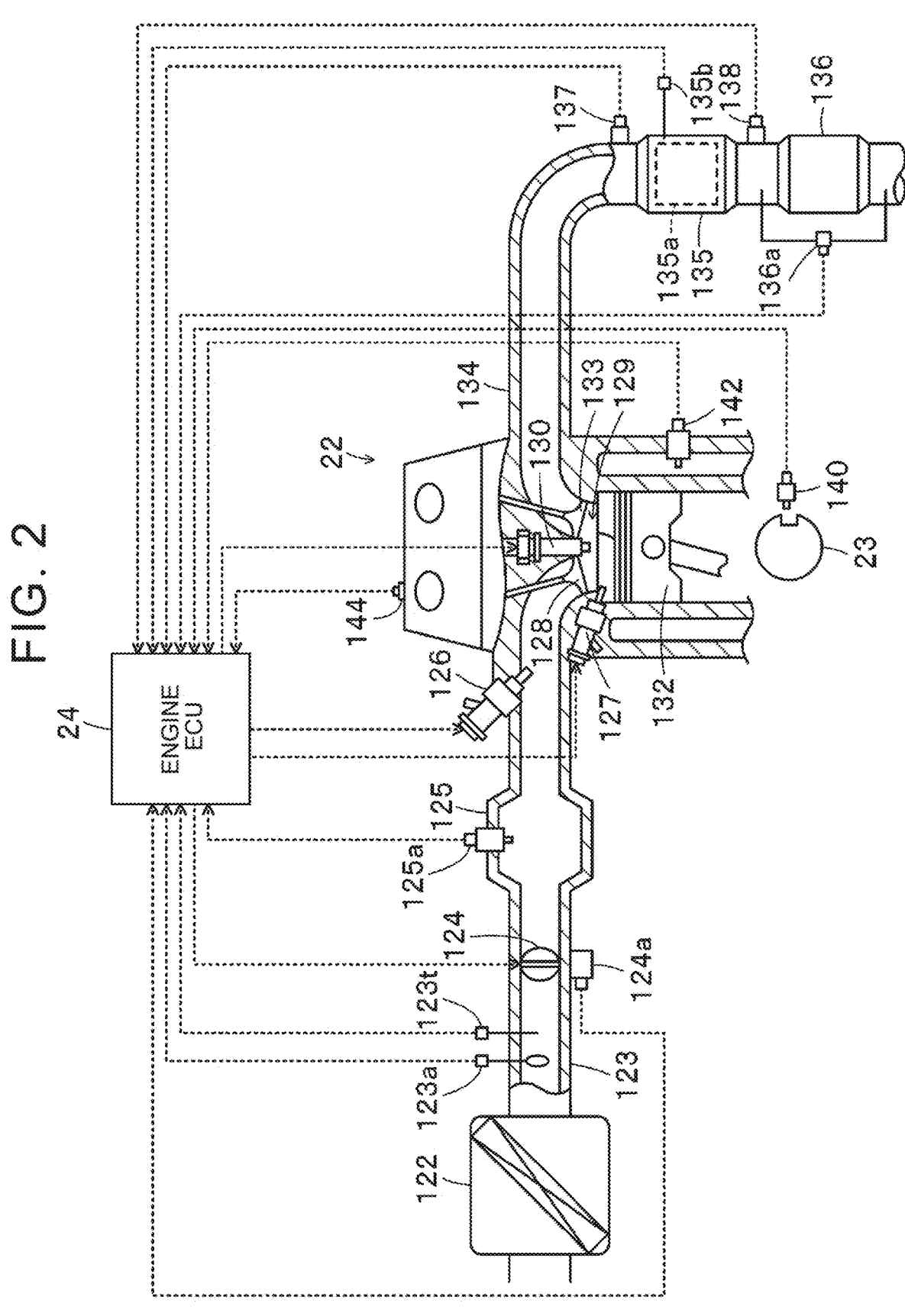
FIG. 2 is a configuration diagram schematically showing the configuration of the engine 22.

Next, an embodiment of the present disclosure will be described. FIG. 1 is a configuration diagram illustrating an outline of a configuration of a hybrid electric vehicle 20 in which a vehicle control device according to an embodiment of the present disclosure is mounted. FIG. 2 is a configuration diagram illustrating an outline of a configuration of the engine 22 mounted on hybrid electric vehicle 20. Hybrid electric vehicle 20 of the embodiment includes an engine 22 and a motor 30 as power sources, an inverter 32, a clutch KG, an automatic transmission 40, and a hybrid electronic control unit (hereinafter referred to as "HV ECU") 70.

The engine 22 is configured as an internal combustion engine using gasoline as a fuel. As illustrated in FIG. 2, the engine 22 includes a port injection valve 126 that injects fuel into an intake port, and an in-cylinder injection valve 127 that injects fuel into a cylinder. The engine 22 operates in one of the port injection mode, the in-cylinder injection mode, and the shared injection mode. In the port injection mode, air from the air cleaner 122 is sucked into the intake pipe 123 and passed through the throttle valve 124 and the surge tank 125. In the port injection mode, fuel is injected from the port injection valve 126 on the downstream side of the surge tank 125 of the intake pipe 123, and the air and the fuel are mixed. The air-fuel mixture is sucked into the combustion chamber 129 via the intake valve 128, and is explosively burned by an electric spark generated by the spark plug 130. The reciprocating movement of the piston 132, which is depressed by the energy of the explosive combustion in the cylinder bore, is converted into a rotational movement of the crankshaft 23. In the in-cylinder injection mode, air is sucked into the combustion chamber 129, fuel is injected from the in-cylinder injection valve 127 in an intake stroke or a compression stroke, and explosion combustion is performed by an electric spark by the spark plug 130 to obtain a rotational motion of the crankshaft 23. In the shared injection mode, the fuel injection from the port injection valve 126 and the fuel injection from the in-cylinder injection valve 127 are shared. The exhaust gas discharged from the combustion chamber 129 to the exhaust pipe 134 via the exhaust valve 133 is discharged via an exhaust system including an exhaust control device 135 and a gasoline particulate filter (Gasoline Particulate Filter: hereinafter referred to as "GPF") 136. The exhaust control device 135 has an exhaust control catalyst (three-way catalyst) 135a for reducing harmful components of carbon monoxide (CO), hydrocarbons (HC), and nitrogen oxides (NOx) in the exhaust gas. GPF 136 is formed as a porous filter using ceramics, stainless-steel, or the like, and collects particulate matter (PM:ParticulateMatter) such as soot in the exhaust gas. Instead of GPF 136, a quaternary catalyst that combines the exhaust control function of the three-way catalyst and the collection function for particulate matter may be used.

The operation of the engine 22 is controlled by an engine electronic control unit (hereinafter referred to as the "engine ECU") 24. The engine ECU 24 receives, for example, the crank angle θcr from the crank position sensor 140 that detects the rotational position of the crankshaft 23 of the engine 22 and the coolant temperature Tw from the water temperature sensor 142 that detects the temperature of the coolant of the engine 22. The engine ECU 24 receives the cam angles θci and θco from the cam position sensor 144 that detects the rotational position of the intake camshaft that opens and closes the intake valve 128 and the rotational position of the exhaust camshaft that opens and closes the exhaust valve 133. The engine ECU 24 receives the throttle opening degree TH from the throttle valve position sensor 124a that detects the position of the throttle valve 124. The engine ECU 24 receives an intake air amount Qa from an air flow meter 123a mounted upstream of the throttle valve 124 of the intake pipe 123. The engine ECU 24 also receives an intake air temperature Ta from a temperature sensor 123t mounted upstream of the throttle valve 124 of the intake pipe 123 and a surge pressure Ps from a pressure sensor 125a mounted to the surge tank 125. The engine ECU 24 receives a catalyst temperature Tcat from a temperature sensor 135b that detects the temperature of the exhaust control catalyst 135a. The engine ECU 24 receives the front air-fuel ratio AF1 from the front air-fuel ratio sensor 137 mounted upstream of the exhaust control device 135 in the exhaust pipe 134. The engine ECU 24 also receives the differential pressure AP from the differential pressure sensor 136a that detects the differential pressure (differential pressure between the upstream side and the downstream side) before and after the rear air-fuel ratio AF2, GPF 136 from the rear air-fuel ratio sensor 138 mounted between the exhaust control device 135 and GPF 136 of the exhaust pipe 134.

The engine ECU 24 outputs, for example, a control signal to the throttle valve 124, a control signal to the port injection valve 126, a control signal to the in-cylinder injection valve 127, a control signal to the spark plug 130, and the like.

The engine ECU 24 calculates the rotational speed Ne of the engine 22 based on the crank angle θcr of the engine 22 from the crank position sensor 140. The engine ECU 24 also calculates the load factor (ratio of the volume of air actually taken in at one cycle to the stroke volume per cycle of the engine 22) KL based on the intake air amount Qa from the air flow meter 123a and the rotational speed Ne of the engine 22.

The motor 30 is configured as a synchronous generator motor. The rotary shaft 31 to which the rotor of the motor 30 is fixed is connected to the crankshaft 23 of the engine 22 via a clutch K0 and is connected to the input shaft 41 of the automatic transmission 40. The inverter 32 is used to drive the motor 30 and is connected to the power line 61. The motor 30 is rotationally driven when a motor electronic control unit (hereinafter referred to as "motor ECU") 34 performs switching control on a plurality of switching elements of the inverter 32. The motor ECU 34 receives the rotational position θmg from the rotational position sensor 30a that detects the rotational position of the rotor (rotary shaft 31) of the motor 30. The motor ECU 34 receives a phase current Iu,Iv or the like from a current sensor that detects a phase current of each phase of the motor 30, and outputs a control signal or the like to the inverter 32. The motor ECU 34 calculates the rotational speed Nmg of the motor based on the rotational position θmg of the rotor (rotary shaft 31) of the motor 30 from the rotational position sensor 30a.

The clutch K0 is configured, for example, as a hydraulic driven friction clutch and is controlled by the HV ECU 70 to connect and disconnect the crankshaft 23 of the engine 22 to and from the rotary shaft 31 of the motor 30.

The automatic transmission 40 includes a torque converter 43 and, for example, an automatic transmission 45 having six gears. The torque converter 43 is configured as a general fluid transmission device. The torque converter 43 amplifies and transmits the power of the input shaft 41 connected to the rotary shaft 31 of the motor 30 to the transmission input shaft 44, which is the input shaft of the automatic transmission 45, or transmits the torque without amplifying the torque. The automatic transmission 45 includes the transmission input shaft 44, an output shaft 42 connected to drive wheels 49 via a differential gear 48, a plurality of planetary gears, and a plurality of hydraulic driven frictional engagement elements (clutches, brakes). The automatic transmission 45 establishes a forward gear or a rearward gear from first gear to sixth gear by engaging and disengaging the frictional engagement elements, and thereby transmits power between the transmission input shaft 44 and the output shaft 42. Hydraulic pressure of hydraulic oil from a mechanical oil pump or an electric oil pump is regulated and supplied to the clutch K0 or the automatic transmission 45 by a hydraulic control device (not shown).

The battery 60 is configured as, for example, a lithium ion secondary battery or a nickel hydrogen secondary battery having a rated voltage of about several hundred V, and is connected to the power line 61 together with the inverter 32.

HV ECU 70 is configured as a microcomputer. HV ECU 70 inputs, for example, a rotational speed Nin from a rotational speed sensor 41$a$ attached to the input shaft 41 of the automatic transmission 40. HV ECU 70 inputs, for example, a rotational speed Nmi from a rotational speed sensor 44$a$ attached to the transmission input shaft 44 of the automatic transmission 40. HV ECU 70 receives, for example, a rotational speed Nout from a rotational speed sensor 42$a$ attached to the output shaft 42 of the automatic transmission 40. HV ECU 70 also receives a voltage Vb of the battery 60 from a voltage sensor mounted between terminals of the battery 60. HV ECU 70 also receives a current Ib of the battery 60 (positive when discharged from the battery 60) from a current sensor attached to the output terminal of the battery 60. Further, HV ECU 70 receives the ignition signal from the ignition switch 80 and the shift position SP from the shift position sensor 82 that detects the operating position of the shift lever 81. HV ECU 70 receives the accelerator operation amount Acc from the accelerator pedal position sensor 84 that detects the depression amount of the accelerator pedal 83. HV ECU 70 also receives the brake pedal position BP from the brake pedal position sensor 86 that detects the depression amount of the brake pedal 85 and the vehicle speed V from the vehicle speed sensor 87. An operation signal from the mode switch 88 may also be mentioned. The mode switch 88 is a switch for instructing switching of the traveling mode in the order of the normal mode, the sport mode, and the eco mode every time it is operated by the driver. The sport mode (second mode) is a mode in which the output responsiveness of the torque for traveling is emphasized as compared with the normal mode and the eco mode (first mode). The eco mode is a mode that emphasizes energy efficiency in comparison with the normal mode and the sport mode.

HV ECU 70 outputs various control signals via an output port. For example, a control signal to the clutch K0 or the automatic transmission 40 (hydraulic control device) may be used. The HV ECU 70 is connected to the engine ECU 24 and the motor ECU 34 via a communication port. HV ECU 70 calculates an input/output limit Win, Wout as the power storage ratio SOC of the battery 60 and the maximum allowable power that can be input/output to/from the battery 60 based on the voltage Vb and the current Ib of the battery 60.

In hybrid electric vehicle 20 of the embodiment configured in this way, the engine 22, the clutch K0, the motor 30, and the automatic transmission 40 are controlled so as to travel in the hybrid-drive mode (HV drive mode) or the electric drive mode (EV drive mode) by the cooperative control of HV ECU 70, the engine ECU 24, and the motor ECU 34.

In the control of the engine 22 and the motor 30 in HV running mode, HV ECU 70 first sets a required torque Tout* (a driving torque if a positive value is obtained and a braking torque if a negative value is obtained) to the output shaft 42 as the drive shaft on the basis of the accelerator operation amount Ace and the vehicle speed V. Subsequently, a value obtained by dividing the required torque Tout* of the output shaft 42 by the rotational speed ratio Gt of the automatic transmission 40 is set to the required torque Tin* of the input shaft 41. Then, the target torque Te* of the engine 22 and the torque command Tm* of the motor 30 are set so that the required torque Tin* is outputted to the input shaft 41 while the battery 60 is charged and discharged within the input/output limit Win, Wout. Then, the target torque Te* is transmitted to the engine ECU 24 and the torque command Tm* is transmitted to the motor ECU 34. The engine ECU 24 calculates the required load factor KL* from the target torque Te*, and performs operation control (intake air amount control, fuel injection control, ignition control, and the like) of the engine 22 so that the engine 22 is operated at the target torque Te*. In the ignition control, the engine ECU 24 sets the ignition timing of the engine 22 as an efficient ignition timing Tfref for efficiently operating the engine 22. The motor ECU 34 performs switching control of the plurality of switching elements of the inverter 32 so that the motor 30 is driven by the torque command Tm*.

In the control of the engine 22 and the motor 30 in EV running mode, HV ECU 70 first sets the required torque Tout* in the same manner as in HV running mode. Subsequently, a value obtained by dividing the required torque Tout* of the output shaft 42 by the rotational speed ratio Gt of the automatic transmission 40 is set to the required torque Tin* of the input shaft 41. Then, the torque command Tm* of the motor 30 is set so that the required torque Tin* is outputted to the input shaft 41 and the battery 60 is charged and discharged within the input/output limit Win, Wout. Then, the stopping command of the engine 22 is transmitted to the engine ECU 24, and the torque command Tm* is transmitted to the motor ECU 34. The engine ECU 24 shuts down the engine 22. The motor ECU 34 performs switching control of the plurality of switching elements of the inverter 32 so that the motor 30 is driven by the torque command Tm*.

In hybrid electric vehicle 20 of the embodiment, the engine ECU 24 executes an ignition retardation control in which the ignition timing of the engine 22 is retarded from the efficient ignition timing Tfref in order to raise the temperature of the exhaust control catalyst 135$a$ in the exhaust control device 135. In addition, the engine ECU 24 executes an ignition retard control for making the ignition timing of the engine 22 slower than the efficient ignition timing Tfref in order to warm up GPF 136. In addition, the engine ECU 24 executes ignition retardation control for making the ignition timing of the engine 22 slower than the efficient-use ignition timing Tfref when the engine 22 is idle. When the catalyst temperature Tcat detected by the temperature sensor 135$b$ exceeds the threshold Tcat1, the ignition retardation control is prohibited from being executed in order to suppress the temperature rise of the exhaust control catalyst 135$a$. The threshold Tcat1 is a threshold for determining whether or not the exhaust control catalyst 135$a$ in the exhaust control device 135 reaches a high temperature when the ignition retardation control is executed. When the execution of the ignition delay angle control is prohibited, the ignition timing of the engine 22 is Tfref.

Figures 3, 4:
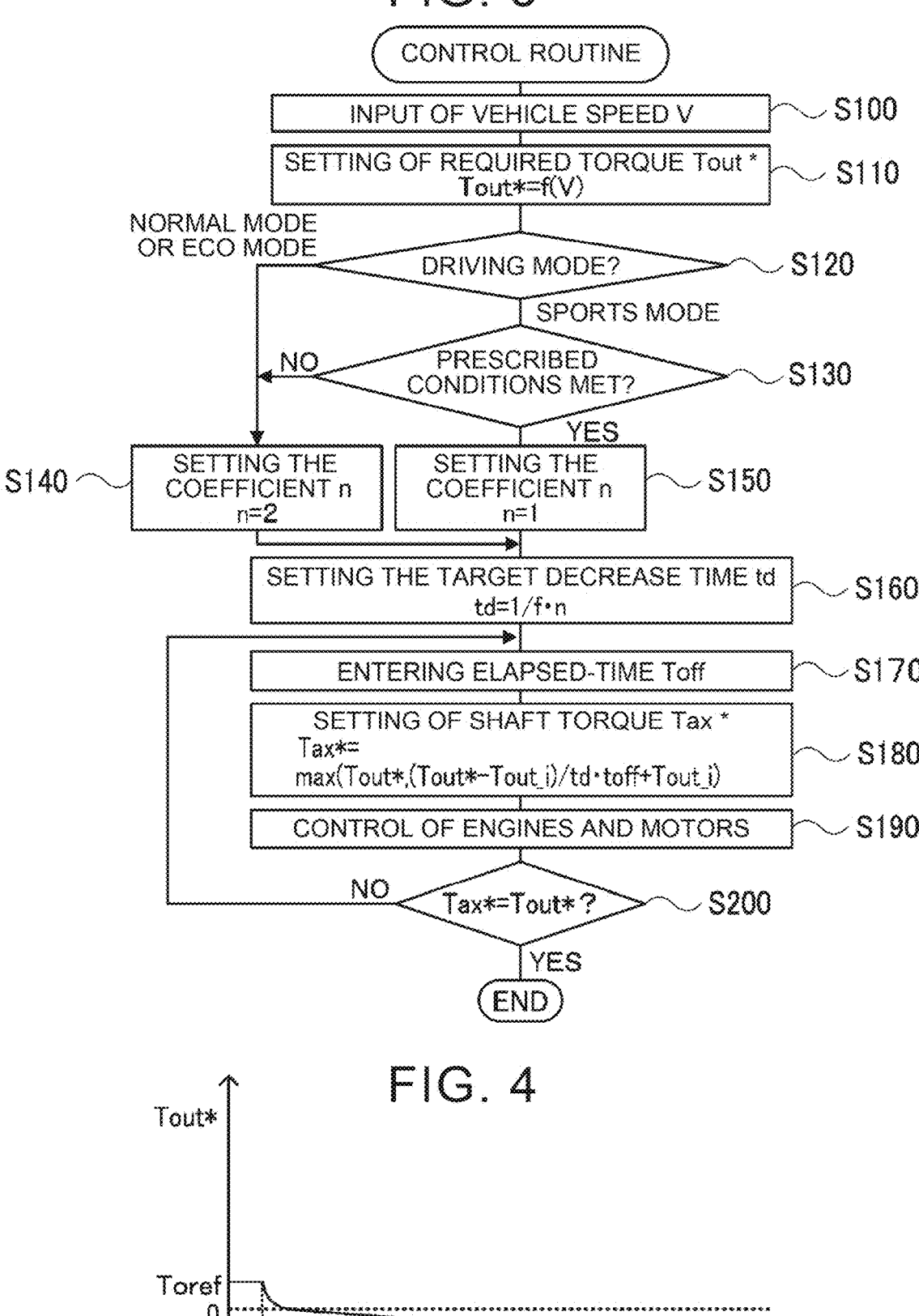
FIG. 3 is a flowchart illustrating an example of a control routine.
FIG. 4 is an explanatory view illustrating an exemplary relation between the vehicle speed V and the required torque Tout*.

Next, the operation of hybrid electric vehicle 20 equipped with the vehicle control device of the embodiment configured as described above, in particular, the operation of the engine 22 and the motor 30 when the accelerator pedal 83 is turned off will be described. FIG. 3 is a flow chart illustrating an exemplary control routine executed by HV ECU 70. This routine is executed at the time of accelerator-off. When the accelerator is turned on while the present routine is being executed, the execution of the present routine is stopped, and the control of HV traveling mode and EV traveling mode described above is executed.

When this routine is executed, HV ECU 70 executes a process of inputting the vehicle speed V (S100). The vehicle speed V is input as detected by the vehicle speed sensor 87.

Next, the required torque Tout* is set based on the inputted vehicle speed V (S110). FIG. 4 is an explanatory diagram illustrating an exemplary relation between the vehicle speed V and the required torque Tout* at the time of accelerator-off. In the drawing, the required torque Tout* is such that the torque on the driving side is a positive value and the torque on the braking side is a negative value. The required torque Tout* is a torque that is output to the output shaft 42 at the time of accelerator-off in a vehicle that is driven by power from the engine without mounting a driving motor, that is, a torque that mimics the engine brake. As illustrated, the required torque Tout* is set to a predetermined torque Toref greater than zero when the vehicle speed V is less than the threshold Vref. As shown in the drawing, the required torque Tout* is set so as to be smaller than 0 when the vehicle speed V is equal to or higher than the threshold Vref and lower than when the vehicle speed V is higher.

Figure 5:
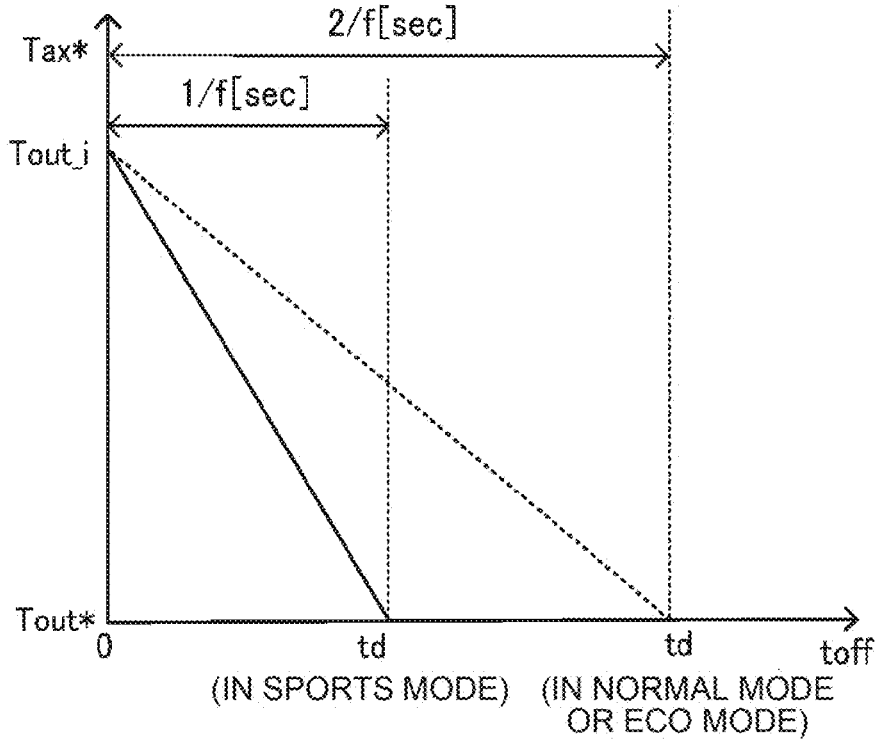
FIG. 5 is a flow chart showing a relation between an axial torque Tax* and an elapsed time toff.

Next, the driving mode set by the mode switch 88 is checked (S120). When the driving mode is the normal mode or the eco mode, the factor n used for setting the target lowering time td in S160 is set to the value 2 (S140). Then, a value obtained by multiplying the inverse of the resonant frequency f of the drive system including the engine 22, the motor 30, and the automatic transmission 40 by the factor n (here, the value 2) is set to the target lowering time td (S160). Then, an elapsed-time toff after the accelerator pedal 83 is turned off is inputted (S170). Next, using the following Equation (1), the shaft torque Tax* is set so that the shaft torque Tax* output to the output shaft 42 gradually decreases toward the required torque Tout* over the target lowering period td within a range not less than the required torque Tout* (S180). In Equation (1), "Tout_i" is the required torque Tout* that was set immediately before the accelerator pedal 83 was turned off. FIG. 5 is an explanatory diagram illustrating a relation between an axial torque Tax* and an elapsed time toff. The axial torque Tax* decreases toward the required torque Tout*, as indicated by the broken line in the drawing, at a time of twice the inverse (=1/f) of the resonant frequency f.

$$Tax^* = \max\left(Tout^*, (Tout^* - Tout\_i)/td \cdot toff + Tout\_i\right) \quad (1)$$

When the axial torque Tax* is set in this manner, the engine 22 and the motor 30 are controlled so that the torque based on the axial torque Tax* is output to the output shaft 42 while the battery 60 is charged and discharged within the input/output limit Win, Wout (S190). In this control, a value obtained by dividing the shaft torque Tax* by the rotational speed ratio Gt of the automatic transmission 40 is set to the required torque Tin* of the input shaft 41. Then, the larger value of the smaller value of the required torque Tin* and the output limit Wout and the input limit Win is set to the torque command Tm* of the motor 30. That is, the torque command Tm* is set to a value obtained by limiting the required torque Tin* by the input/output limit Win, Wout. In HV running mode, a fuel cut command for stopping the supply of fuel to the engine 22 is transmitted to the engine ECU 24, and a torque command Tm* is transmitted to the motor ECU 34. In EV running mode, a stop command of the engine 22 is transmitted to the engine ECU 24 and a torque command Tm* is transmitted to the motor ECU 34. The engine ECU

24 stops supplying fuel to the engine 22 or stops the operation of the engine 22. The motor ECU 34 performs switching control of the plurality of switching elements of the inverter 32 so that the motor 30 is driven by the torque command Tm*. As described above, since the torque output to the output shaft 42 is reduced by an integral multiple (here, twice) of the resonance frequency f of the drive system, the vibration caused by the resonance of the drive system can be suppressed. Then, it is determined whether or not the axial torque Tax* has reached the required torque Tout* (S200). When the shaft torque Tax* is not the required torque Tout*, S170 returns. When the shaft torque Tax* reaches the required torque Tout*, the routine ends.

When the traveling mode is the sporting mode in S120, it is determined whether or not a predetermined condition that is prohibited from rapidly lowering the torque output to the output shaft 42 is satisfied (130). The predetermined conditions include first and second conditions. The first condition may include a condition in which the absolute value of the input-limit Win (negative value) is smaller than the threshold Winref. The threshold Winref is a threshold for determining whether or not the absolute value of the input-limit Win is small. The second condition may be a condition in which the catalyst temperature Tcat detected by the temperature sensor 135*b* exceeds the threshold Tcat1 and the above-described ignition retardation control is prohibited from being executed, that is, a condition in which the ignition retardation is prohibited in order to suppress the temperature rise of the exhaust control catalyst 135*a*. The predetermined condition is assumed to be satisfied when at least one of the first condition and the second condition is satisfied.

When the predetermined condition is not satisfied in S130, the coefficient n is set to 1 smaller than the coefficient n set in S140 (S150). Then, a value obtained by multiplying the inverse of the resonant frequency f of the drive system by the factor n (here, the value 1) is set to the target lowering time td (S160). In addition, an elapsed-time toff is entered (S170). Next, using Equation (1) described above, the shaft torque Tax* is set so that the shaft torque Tax* output to the output shaft 42 gradually decreases toward the required torque Tout* over the target lowering period td within a range not lower than the required torque Tout* (S180). When the shaft torque Tax* is set in this manner, the engine 22 and the motor 30 are controlled so that the shaft torque Tax* is output to the output shaft 42 (S190), and it is determined whether or not the shaft torque Tax* is the required torque Tout* (S200). When the shaft torque Tax* is not the required torque Tout*, S170 returns. When the shaft torque Tax* is the required torque Tout*, this routine is terminated. When the predetermined condition is not satisfied in S130, the axial torque Tax* decreases toward the required torque Tout* at a time of 1 times the inverse (=1/f) of the resonant frequency f as indicated by a solid line in FIG. 5. Since the resonance frequency f decreases by an integer multiple of the inverse of the resonance frequency f, the vibration of the drive system can be suppressed. In addition, the torque output to the output shaft 42 can be rapidly reduced as compared with the axial torque Tax* of the normal mode or the eco mode indicated by a broken line in FIG. 5. In the sport mode, the output responsiveness is emphasized, but since the torque output to the output shaft 42 can be rapidly reduced, the torque responsiveness according to the sport mode can be achieved. Accordingly, it is possible to achieve both suppression of vibration and achievement of torque responsiveness according to the traveling mode.

When the predetermined condition is satisfied in S130, the factor n is set to 2 (S140). Then, a value obtained by multiplying the inverse of the resonant frequency f of the drive system by the factor n (here, the value 1) is set to the target lowering time td (S160). In addition, an elapsed-time toff is entered (S170). Then, using Equation (1) described above, the shaft torque Tax* is set so that the shaft torque Tax* output to the output shaft 42 gradually decreases toward the required torque Tout* over the target lowering period td within a range not lower than the required torque Tout* (S180). When the shaft torque Tax* is set in this manner, the engine 22 and the motor 30 are controlled so that the shaft torque Tax* is output to the output shaft 42 (S190), and it is determined whether or not the shaft torque Tax* is the required torque Tout* (S200). When the shaft torque Tax* is not the required torque Tout*, S170 returns. When the shaft torque Tax* is the required torque Tout*, this routine is terminated. When the predetermined condition is satisfied in S130, since the factor n is set to 2, the torque output to the output shaft 42 can be reduced at the same rate as the axial torque Tax* of the normal mode or the eco mode shown by the broken line in FIG. 5.

When the first condition among the predetermined conditions is satisfied in S130, the electric power (negative value) for actually charging the battery 60 may be smaller than the input limit Win (negative value) when the axial torque Tax* set by using the above-described Equation (1) suddenly decreases to a negative value. That is, the battery 60 may be charged with electric power exceeding the input-limit Win. When the first condition is satisfied, since the target lowering period td is increased by increasing the factor n, it is possible to suppress a sudden decrease in the torque outputted from the motor 30. Accordingly, it is possible to prevent the battery 60 from being charged with electric power exceeding the input-limit Win, and to protect the battery 60.

When the second condition is satisfied among the predetermined conditions, if the torque outputted from the engine 22 is rapidly reduced at the time of accelerator-off, more intake air is supplied to the exhaust control catalyst 135a, and the temperature of the exhaust control catalyst 135a increases. When the ignition retardation is prohibited, the target lowering period td is increased by increasing the factor n, thereby suppressing a sudden decrease in the torque outputted from the motor 30. Accordingly, the temperature rise of the exhaust control catalyst 135a can be suppressed, and the exhaust control catalyst 135a can be protected.

According to hybrid electric vehicle 20 of mounting the vehicle control device of the embodiment described above, the target lowering-time td is set to be 1 or 2 times the inverse of the resonant frequency f of the drive system in accordance with the traveling mode. Therefore, it is possible to achieve both suppression of vibration and achievement of torque responsiveness according to the traveling mode.

Further, the plurality of modes include a normal mode or an eco mode, and a sport mode in which the output responsiveness of the torque for traveling is emphasized as compared with the normal mode or the eco mode. When the traveling mode is the sport mode, the coefficient n is made smaller than that in the normal mode or the eco mode, so that the torque responsiveness can be improved in the sport mode.

Further, in the case where the traveling mode is the sport mode, when a predetermined condition that is prohibited from rapidly lowering the torque output to the output shaft 42 as the drive shaft is satisfied, n is made larger than when the predetermined condition is not satisfied. Therefore, it is possible to lengthen the time for lowering the torque output to the output shaft 42.

Since the predetermined condition includes the first condition that limits the torque output from the motor 30 in order to suppress the discharging power of the battery 60 from exceeding the output limit Wout, the torque responsiveness can be improved.

Further, since the predetermined condition includes the second condition in which the ignition retardation angle for delaying the ignition timing of the engine 22 is prohibited in order to suppress the temperature rise of the exhaust control catalyst 135a, the temperature rise of the exhaust control catalyst 135a can be suppressed and the exhaust control catalyst 135a can be protected.

In the above-described embodiment, the coefficient n is set to the value 1 when the travel mode is the sport mode and the predetermined condition is not satisfied. When the traveling mode is the normal mode or the eco mode, or when the predetermined condition is satisfied even when the traveling mode is the sport mode, the coefficient n is set to the value 2. However, the coefficient n may be an integer having a value of 1 or more. When the predetermined condition is not satisfied in the sport mode, the coefficient n may be set to be smaller than when the traveling mode is the normal mode or the eco mode, or when the predetermined condition is satisfied in the sport mode. For example, the coefficient n may be set to the value 2 when the travel mode is the sport mode and the predetermined condition is not satisfied. When the traveling mode is the normal mode or the eco mode, or when the predetermined condition is satisfied when the traveling mode is the sport mode, the coefficient n may be set to the value 4.

In the above-described embodiment, in the case where the traveling mode is the sport mode, the coefficient n is set to the value 1 when the predetermined condition is not satisfied, and the coefficient n is set to the value 2 when the predetermined condition is satisfied. However, when the traveling mode is the sport mode, the coefficient n may be uniformly set to the value 1 regardless of whether or not the predetermined condition is satisfied.

In the above-described embodiment, the predetermined condition includes both the first condition and the second condition, but may include one of the first condition and the second condition. The predetermined condition may include a condition different from the first and second conditions as long as it is prohibited to quickly reduce the torque output to the output shaft 42 as the drive shaft.

In the above-described embodiment, the vehicle control device of the present disclosure is applied to a hybrid electric vehicle 20 including the engine 22 and the motor 30. However, the vehicle control device of the present disclosure may be applied to a hybrid electric vehicle including an engine 22, a first motor, a planetary gear having a carrier connected to an output shaft of the engine 22 and a first motor connected to a sun gear, and a second motor connected to a ring gear of the planetary gear. The vehicle control device of the present disclosure may be applied to an automobile including the engine 22 without a motor for outputting driving power, or may be applied to an automobile including a motor without an engine.

The correspondence between the main elements of the embodiment and the main elements of the disclosure described in the section of the means for solving the problem is an example for specifically explaining the embodiment of the disclosure described in the section of the means for solving the problem. Therefore, the elements of the disclosure described in the section of the means for solving the problem are not limited. That is, the interpretation of the disclosure described in the section of the means for solving the problem should be performed based on the description in the section, and the embodiments are only specific examples of the disclosure described in the section of the means for solving the problem.

Although the embodiments for carrying out the present disclosure have been described above, the present disclosure is not limited to such embodiments at all, and it is needless to say that the present disclosure can be carried out in various forms without departing from the gist of the present disclosure.

The present disclosure is applicable to a manufacturing industry of a vehicle control device and the like.

What is claimed is:

1. A vehicle control device to be used for a vehicle including at least one power source that outputs power to a drive shaft connected to an axle, the vehicle control device being configured to:

control the power source such that the vehicle travels in one travel mode selected from a plurality of modes;

control, at an accelerator off time, the power source such that torque output to the drive shaft gradually reduces over a target lowering time toward required torque for the accelerator off time; and set the target lowering time to n times an inverse of a resonance frequency of a drive system including the power source, wherein the n is an integer having a value of 1 or more, and is changed according to the travel mode, wherein the modes include a first mode and a second mode that emphasizes an output responsiveness of travel torque compared to the first mode, and the n is made smaller when the travel mode is the second mode than when the travel mode is the first mode, and wherein, in a case where the travel mode is the second mode, the n is made larger when a predetermined condition for prohibiting an immediate reduction in torque to be output to the drive shaft is met than when the predetermined condition is not met.

2. The vehicle control device according to claim 1, wherein:

the vehicle includes a motor as the power source and a battery that exchanges electric power with the motor; and the predetermined condition includes a condition that an absolute value of an input limit as allowable maximum power allowed to be input to the battery is smaller than a predetermined threshold value.

3. The vehicle control device according to claim 1, wherein:

the vehicle includes an engine as the power source in which an exhaust control device including an exhaust control catalyst that controls exhaust gas is attached to an exhaust system; and the predetermined condition includes a condition that ignition retardation to retard an ignition timing of the engine is prohibited to suppress a temperature rise of the exhaust control catalyst.

* * * * *